United States Patent
Dow et al.

(10) Patent No.: US 8,689,206 B2
(45) Date of Patent: Apr. 1, 2014

(54) ISOLATING OPERATING SYSTEM IN-MEMORY MODULES USING ERROR INJECTION

(75) Inventors: Eli M. Dow, Poughkeepsie, NY (US); Marie R. Laser, Poughkeepsie, NY (US); Jessie Yu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 12/398,697

(22) Filed: Mar. 5, 2009

(65) Prior Publication Data

US 2010/0229167 A1 Sep. 9, 2010

(51) Int. Cl.
G06F 9/44 (2006.01)
G06F 9/445 (2006.01)
G06F 11/07 (2006.01)

(52) U.S. Cl.
USPC .............. 717/170; 717/168; 717/174; 714/41

(58) Field of Classification Search
None
See application file for complete search history.

(56) References Cited

U.S. PATENT DOCUMENTS

| | | | |
|---|---|---|---|
| 6,477,666 B1 * | 11/2002 | Sanchez et al. ............... | 714/41 |
| 6,484,276 B1 * | 11/2002 | Singh et al. .................. | 714/41 |
| 6,795,965 B1 | 9/2004 | Yadav | |
| 6,915,513 B2 * | 7/2005 | Duesterwald et al. ........ | 717/168 |
| 7,076,770 B2 | 7/2006 | Handal | |
| 7,263,689 B1 | 8/2007 | Edwards et al. | |
| 7,330,718 B2 | 2/2008 | Liu et al. | |
| 7,389,505 B2 | 6/2008 | Berenberg et al. | |
| 7,404,107 B2 * | 7/2008 | Burk ............................... | 714/41 |
| 7,461,374 B1 * | 12/2008 | Balint et al. .................. | 717/174 |
| 7,765,579 B2 * | 7/2010 | Wallace ........................... | 726/1 |
| 7,818,736 B2 * | 10/2010 | Appavoo et al. ............. | 717/168 |
| 7,886,287 B1 * | 2/2011 | Davda ........................... | 717/168 |
| 8,146,073 B2 * | 3/2012 | Sinha ............................ | 717/170 |
| 2004/0107416 A1 * | 6/2004 | Buban et al. .................. | 717/170 |
| 2004/0237080 A1 | 11/2004 | Roth | |
| 2006/0143540 A1 * | 6/2006 | Burk ............................... | 714/41 |
| 2007/0061372 A1 * | 3/2007 | Appavoo et al. ............. | 707/200 |
| 2009/0259999 A1 * | 10/2009 | Srinivasan .................... | 717/170 |

OTHER PUBLICATIONS

Hjálmtýsson, G., et al., Dynamic C++ Classes: A lightweight mechanism to update code in a running program, USENIX Annual Technical Conference, Jun. 1998, 13 pages, [retrieved on Jul. 26, 2012], Retrieved from the Internet: <URL:https://www.usenix.org/>.*

(Continued)

*Primary Examiner* — Thuy Dao
*Assistant Examiner* — Geoffrey St Leger
(74) *Attorney, Agent, or Firm* — Cantor Colburn LLP; Steven Chiu

(57) ABSTRACT

A continuously operating system is provided and includes a processor and a computer readable medium to which the processor is operatively coupled, the computer readable medium having executable instructions stored thereon which, when executed, cause the processor to continuously load an operating system and to simultaneously operate as at least first and second mechanisms. The first mechanism loads a new module, which is a new version of an in-memory module of the operating system, into the operating system, and the second mechanism isolates and interrupts current access to the in-memory module such that subsequent access is to the new module.

17 Claims, 2 Drawing Sheets

(56) References Cited

OTHER PUBLICATIONS

Figure 1:
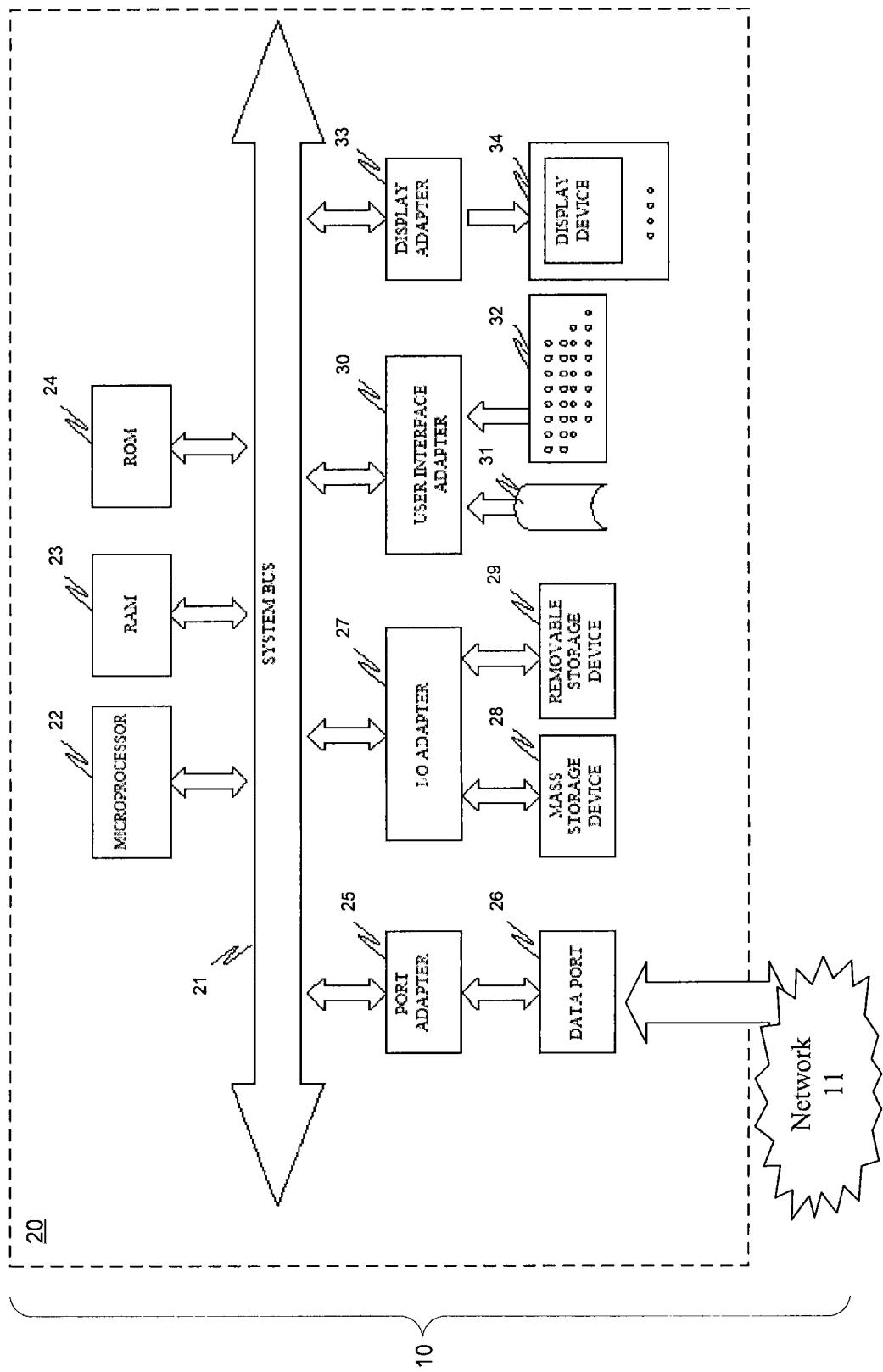

Baumann, A., Dynamic Update for Operating Systems, Doctor of Philosophy, School of Computer Science and Engineering, The University of New South Wales, Aug. 2007, 112 pages, [retrieved on Jul. 30, 2012], Retrieved from the Internet: <URL:http://ssrg.nicta.com.au/publications/papers/Baumann:phd.pdf>.*

Haibo Chen et al.; "Live Updating Operating Systems Using Virtualization"; VEE'06 Jun. 14-16, 2006 Ottawa, Ontario, Canada, pp. 35-44.

* cited by examiner

ISOLATING OPERATING SYSTEM IN-MEMORY MODULES USING ERROR INJECTION

BACKGROUND

Aspects of the present invention are directed to a system and a method of testing operating system isolation using error injection.

Modern enterprise systems are employed by large entities, such as corporations and universities, small entities and individuals for computing services. In that way, the enterprise systems are formed of significant hardware resources and software, including an operating system, installed on the hardware. The hardware and software are then accessed and used by individuals on their own or within the entities for their computing needs.

Since computing services are so often integral to the proper functioning of individuals within the entities, uninterrupted availability of the enterprise systems that are being used by the entities is one of the key features in modern enterprise systems. Unfortunately, these systems still need to be brought down on occasion for maintenance. With that said, tools are available for mitigating the need for bringing down systems for maintenance purposes. These tools include dynamic software updates with which software used by the systems is updated without the systems on the whole having to be brought down although the software being updated must be restarted to incorporate any new changes.

For kernel modules that are system critical, however, it is understood that such kernel modules cannot be refreshed without causing systems failures. In these cases, dynamic software updates cannot be used.

SUMMARY

In accordance with an aspect of the invention, a continuously operating system is provided and includes a processor and a computer readable medium to which the processor is operatively coupled, the computer readable medium having executable instructions stored thereon which, when executed, cause the processor to continuously load an operating system and to simultaneously operate as at least first and second mechanisms. The first mechanism loads a new module, which is a new version of an in-memory module of the operating system, into the operating system, and the second mechanism isolates and interrupts current access to the in-memory module such that subsequent access is to the new module.

In accordance with another aspect of the invention, a computer readable medium is provided, to which a processor of a continuously operating system is operatively coupled, having executable instructions stored thereon which, when executed, cause the processor to continuously load an operating system and to simultaneously to operate as at least first and second mechanisms, wherein the first mechanism loads a new module, which is a new version of an in-memory module of the operating system, into the operating system, and the second mechanism isolates and interrupts current access to the in-memory module such that subsequent access is to the new module.

In accordance with yet another aspect of the invention, a method of managing a continuously operating system in accordance with executable instructions stored in a computer readable medium for execution by a processor of the system, which continuously loads an operating system, is provided and includes assigning a version number to a new module to be loaded into the operating system, determining, from the version number, whether the new module is a new version of an in-memory module, in an event the new module is a new version of the in-memory module, loading the new module at an unused location of system memory and updating a module table therein with an address of the unused location, and, in an event of current access to the in-memory module, interrupting the current access to initiate a retry, including a reading of the address from the module table and subsequent access to the new module at the address.

BRIEF DESCRIPTIONS OF THE SEVERAL VIEWS OF THE DRAWINGS

Figure 2:
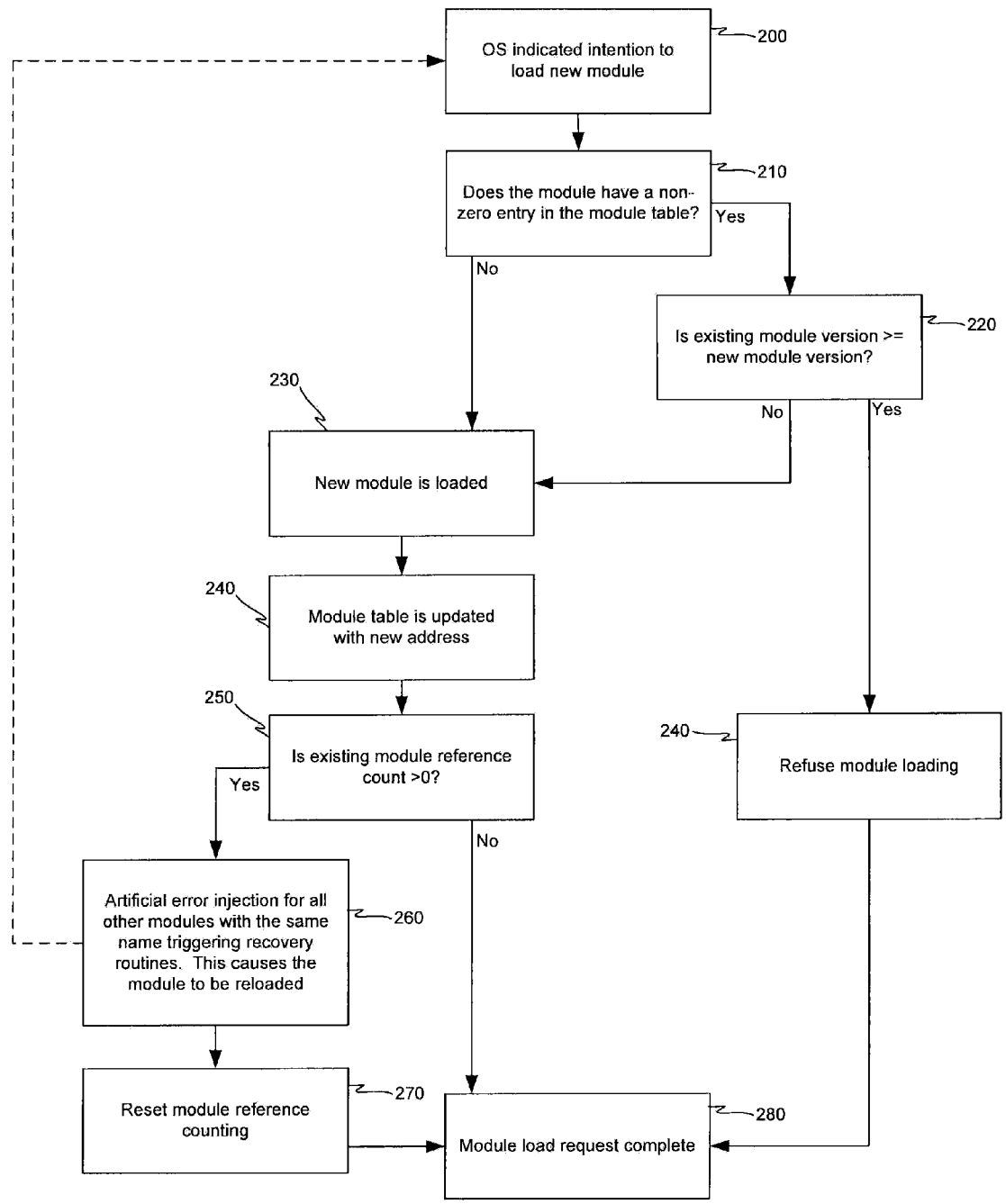

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a schematic illustration of a computing system in accordance with embodiments of the invention; and FIG. 2 is a flow diagram illustrating a method of managing the computing system of FIG. 1.

DETAILED DESCRIPTION

With reference to FIGS. 1 and 2, a continuously operating computing system 10 is provided. The system 10 may include one or more computing devices 20 that communicate with each other via connections with a network 11. Where the system 10 includes a set of computing devices 20, such as where the system 10 is used by a corporate entity, the computing devices 20 each operate in accordance with an enterprise class operating system (OS) which is widely distributed. In this case, in order to promote efficiency within the entity, the operating system is to be maintained with the least possible downtime without failure.

Each of the computing devices 20 includes multiple components and each of the multiple components has multiple functions. A system bus 21 is provided to allow each of the components to interact with others. A microprocessor 22 (i.e., a central processing unit) is provided to perform computing operations and calculations. Random Access Memory (RAM) 23 and Read-Only Memory (ROM) 24, along with additional types of memory, act as computer readable media and provide storage space for the storage of information and instructions for use by the microprocessor 22. A port adapter 25, to which a data port 26 is coupled, is coupled to the system bus 21 and allows for the computing device 20 to communicate with the network 11. A mass storage device 28 and a removable storage device 29 provide additional storage space for information and are coupled to the system bus 21 by way of an input/output (I/O) adapter 27. User interface devices 31 and 32, such as a mouse and a keyboard, allow a user of the computing device 20 to issue commands and are coupled to the system bus 21 by way of the user interface adapter 30. Finally, a display device 34, which is coupled to the system bus 21 by way of the display adapter 33, allows for the display of information to the user.

In accordance with embodiments of the invention, the microprocessor 22 and the RAM 23 and the ROM 24, along with the other components described above, are associated with the computing device 20 and the system 10 as a whole. In that way, the microprocessor 22 and the RAM 23 and the ROM 24 are operatively coupled to one another as described above with the computer readable media having executable instructions stored thereon. These executable instructions, when executed, cause the microprocessor 22 to continuously load the operating system by continuously executing the operating system instructions and to simultaneously operate as at least first and second mechanisms. The first mechanism, which may be regarded as a compiler, serves to translate code of a source program, which is usually written in a programming language, into machine language code of a new module, which, in some cases, is a new version of an in-memory kernel module of the operating system. The second mechanism, which may be regarded as a loader, loads executable instructions into memory and isolates and interrupts current access to the in-memory module such that subsequent access is to the new module. Here, although the first and second mechanisms have been described as relating to a compiler and a loader, respectively, it is understood that this convention is merely exemplary and that functions normally associated with compilers may be undertaken by the second mechanism and functions normally associated with loaders may be undertaken by the first mechanism.

Since the microprocessor 22 continuously executes the operating system instructions while the new module is loaded, while the previously loaded version of the same module is isolated and while the current and future access to the module is redirected, the need for shutting down the computing device 20 and/or the system 10, as a whole, is mitigated. Thus, downtime for the system 10 is decreased even though maintenance may be performed on the kernel modules of the operating system with the operating system being otherwise available for use on an uninterrupted basis.

The new and in-memory modules refer to kernel modules of the operating system. A kernel module, in this context, may refer to a single executable object which encapsulates some logical unit of kernel functionality. That is, as an example, multiple drivers for software or some other logical grouping of functionality might be separate individual source files. These source files are compiled by being transformed from high level source code into single logical binary units. Each logical binary unit is a kernel module. Typical kernel modules have names that end in an extension like .ko, such as kernel objects in Linux, though other operating systems may not have specialized extensions, yet implement similar concepts under differing names.

The operating system is configured to recognize when the new module is to be loaded (see operation 200 of FIG. 2). The compiler compiles the source code of the new module during a compilation time thereof and assigns a version number to the new module.

Upon new module compilation completion, the loader determines whether the new module is a version of the in-memory module, which is already loaded into the memory. This operation is shown schematically in operation 210 of FIG. 2 in which the question of whether the module (i.e., the new module) has a non-zero entry in the module table is considered. The module table refers to data that describes a location in system memory at which a module is located. Thus, if the new module is a version of the in-memory module, the loader will recognize that the module table indicates that a module that is substantially similar to the new module is already stored at an address within the system memory. In many cases, each module typically has a name associated with it. The loader can compare the name of the new module and that of the in-memory module to decide if the new module is a version of the in-memory module. The loader will then proceed to operation 220. On the other hand, if no instance of the module already exists in the memory, the loader loads the new module to an unused location of the memory (operation 230).

At operation 220, the loader determines whether the new module is or is not a new version of the preloaded module by comparing the version number of the new module with that of the in-memory module. Here, it will generally be the case that the newer module will have the greater version number, as shown in FIG. 2, although this is not required and embodiments exist in which this is not necessarily the case. In any event, if the comparison reveals that the in-memory module is the newer version, the loading of the new module is refused (operation 240) and the module load request is regarded as complete (operation 280). Conversely, if the new module is the newer version, the new module is loaded into the memory in accordance with operation 230 at the unused location.

Once the new module is loaded, the loader updates the module table with the address of the memory at which the new module is loaded (operation 240).

The loader then determines whether the in-memory module is currently being accessed by a program of the operating system. This determination is accomplished by the operating system, which marks module entry and exit points during normal operations as shown in FIG. 2 in which it is determined whether the in-memory module has a reference count which is greater than zero. If the in-memory module is not being currently accessed, the module load request is regarded as being complete (operation 280). In this case, subsequent access by a program to the module is made to the new module following a read of the address of the new module in the module table. If, on the other hand, the in-memory module is being currently accessed by a program, control proceeds to operation 260.

At operation 260, the in-memory module will be found to have current execution threads and, at this point, the loader will artificially inject an error into the running or execution of the in-memory module. This error injection will initiate retry mechanisms on the module which involve a reading of the address of the new module from the module table such that subsequent access by the accessing program is only made to the new module. Subsequently, the reference count for the module (i.e., the new module) is reset (operation 270). In this way, the in-memory module may be regarded as being isolated from the operating system programs such that future access to the in-memory module by these programs is prevented.

In a further embodiment, it is possible for the module into which the error is injected to percolate the recovery process to its caller. The caller's recovery routine can then initiate a retry, which will call the module again using the new address.

In accordance with further embodiments of the invention, the in-memory module, having been isolated, may also be invalidated. Invalidation may include marking memory pages of the per-loaded module as being invalid and/or turning memory pages of a non-executable (NX) bit of the in-memory module on. Additionally or alternately, the in-memory module may be deleted entirely from the module table, the memory or both. At this point the module table should already have no reference to the old module (the entry should now contain the address for the new module). So the old module can't really be deleted from the module table.

This is how application binary isolation (ABI) can be tested. At this point, any attempt to access the module in a non-standard way (e.g. using a hard coded address rather than reading from the module table) would trigger a segment fault since the pages are now invalid.

In accordance with another aspect of the invention, a computer readable medium is provided, to which a microprocessor 22 of a continuously operating system 10 is operatively coupled, having executable instructions stored thereon which, when executed, cause the microprocessor 22 to continuously load an operating system and to simultaneously to operate as at least first and second mechanisms. As above, the first mechanism loads a new module, which is a new version of an in-memory module of the operating system, into the operating system, and the second mechanism isolates and interrupts current access to the in-memory module such that subsequent access is to the new module.

In accordance with another aspect of the invention, a method of managing a continuously operating system 10 in accordance with executable instructions stored in a computer readable medium for execution by a microprocessor 22 of the system 10, which continuously loads an operating system, is provided. The method includes assigning a version number to a new module to be loaded into the operating system during compilation of the new module, and determining, from the version number, whether the new module is a new version of an in-memory module. In an event the new module is a new version of the in-memory module, the method further includes loading the new module at an unused location of system memory and updating a module table therein with an address of the unused location. Also, in an event of current access to the in-memory module, the method still further includes interrupting the current access to initiate a retry, including a reading of the address from the module table and subsequent access to the new module at the address.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A continuously operating system, comprising:
a processor and a memory to which the processor is operatively coupled, the memory having executable instructions stored thereon which, when executed, cause the processor to continuously load an operating system and to simultaneously operate as at least first and second mechanisms, wherein
a new module to be loaded into the operating system is assigned a version number from which the new module being a new version of an in-memory module is determinable,
the first mechanism loads the new module, which is determined to be the new version of the in-memory module of the operating system, into the operating system and updates a module table with an address of the new module, and
the second mechanism determines whether the in-memory module is currently being accessed and, in an event that current access to the in-memory module is occurring, injects an error into the current access to initiate a retry and subsequently resets a module reference count to isolate the in-memory module,
the retry including a reading of the address of the new module from the module table such that subsequent access is to the new module at the read address.

2. The continuously operating system according to claim 1, wherein the first mechanism assigns the version number to the new module.

3. The continuously operating system according to claim 1, wherein the second mechanism loads the new module to a previously unused location in system memory and updates the module table, which is readable for the subsequent access.

4. The continuously operating system according to claim 3, wherein the second mechanism prevents future access to the in-memory module.

5. The continuously operating system according to claim 3, wherein the second mechanism invalidates the in-memory module.

6. The continuously operating system according to claim 3, wherein the second mechanism marks the in-memory module invalid.

7. The continuously operating system according to claim 3, wherein the second mechanism turns a non-executable (NX) bit of the in-memory module on.

8. The continuously operating system according to claim 3, wherein the second mechanism deletes the in-memory module from the module table.

9. A non-transitory computer readable medium, to which a processor of a continuously operating system is operatively coupled, having executable instructions stored thereon which, when executed, cause the processor to continuously load an operating system and to simultaneously operate as at least first and second mechanisms, wherein
a new module to be loaded into the operating system is assigned a version number from which the new module being a new version of an in-memory module is determinable,
the first mechanism loads the new module, which is determined to be the new version of the in-memory module of the operating system, into the operating system and updates a module table with an address of the new module, and
the second mechanism determines whether the in-memory module is currently being accessed and, in an event that current access to the in-memory module is occurring, injects an error into the current access to initiate a retry and subsequently resets a module reference count to isolate the in-memory module,
the retry including a reading of the address of the new module from the module table such that subsequent access is to the new module at the read address.

10. A method of managing a continuously operating system in accordance with executable instructions stored in a computer readable medium for execution by a processor of the continuously operating system, which continuously loads an operating system, the method comprising:
assigning a version number to a new module to be loaded into and stored in a memory of the operating system;
determining, from the version number, whether the new module is a new version of an in-memory module;
in an event the new module is a new version of the in-memory module, loading the new module at a previously unused location of system memory and updating a module table therein with an address of the previously unused location; and
determining whether the in-memory module is currently being accessed and, in an event of current access to the in-memory module, injecting an error into the current access to thereby interrupt the current access and initiate a retry and subsequently resetting a module reference count to isolate the in-memory module, the retry including a reading of the address of the previously unused location from the module table whereby subsequent access to the new module occurs at the address of the previously unused location.

11. The method according to claim 10, further comprising verifying that the new module is substantially similar to the in-memory module.

12. The method according to claim 10, wherein the determining comprises determining which version number of the new module and the in-memory module is larger.

13. The method according to claim 10, further comprising checking whether the in-memory module has current execution threads.

14. The method according to claim 10, further comprising invalidating the in-memory module.

15. The method according to claim 10, further comprising marking the in-memory module as invalid.

16. The method according to claim 10, further comprising turning a non-executable bit of the in-memory module on.

17. The method according to claim 10, further comprising deleting the in-memory module from the module table.

* * * * *